(12) United States Patent
Girondi

(10) Patent No.: US 11,565,204 B2
(45) Date of Patent: Jan. 31, 2023

(54) WATER SEPARATION UNIT

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 169 days.

(21) Appl. No.: 16/647,428

(22) PCT Filed: Sep. 14, 2018

(86) PCT No.: PCT/IB2018/057039
§ 371 (c)(1),
(2) Date: Mar. 13, 2020

(87) PCT Pub. No.: WO2019/053641
PCT Pub. Date: Mar. 21, 2019

(65) Prior Publication Data
US 2020/0261835 A1 Aug. 20, 2020

(30) Foreign Application Priority Data
Sep. 15, 2017 (IT) .......................... 102017000103387

(51) Int. Cl.
*B01D 36/00* (2006.01)
*F02M 37/32* (2019.01)
(Continued)

(52) U.S. Cl.
CPC .......... *B01D 36/006* (2013.01); *B01D 29/15* (2013.01); *B01D 29/56* (2013.01); *F02M 37/24* (2019.01);
(Continued)

(58) Field of Classification Search
CPC ..... B01D 36/002; B01D 36/006; F02M 37/24
See application file for complete search history.

(56) References Cited

U.S. PATENT DOCUMENTS 9,194,343 B2 11/2015 Thienel
2007/0125695 A1* 6/2007 Pichler ................. B01D 36/003
210/259
(Continued)

FOREIGN PATENT DOCUMENTS

DE 10 2006 005 108 A1 8/2007
DE 10 2008 034 901 A1 1/2010
(Continued)

OTHER PUBLICATIONS

Examination Report for European Patent Application No. 18783105.2 dated Dec. 22, 2020, 3 pages.
(Continued)

*Primary Examiner* — Benjamin M Kurtz
(74) *Attorney, Agent, or Firm* — Merchant & Gould P.C.

(57) ABSTRACT

A water separation group is for a fuel filtration and separation assembly of a vehicle fuel circulation system. The assembly extends along a longitudinal axis positionable in the vehicle in a horizontal position having a filtration group. The water separation assembly is associable to the filtration group for receiving filtered fuel, being positioned in series along the longitudinal axis. The water separation assembly has a main body defining a separation chamber and at an axial end, an outlet wall with an outlet mouth. A separator is accommodated in the separation chamber. A blocking device is below the separator to prevent the return of water to the separator. The blocking device has a blocking surface extending longitudinally forming an angle that inclines at least a portion of the blocking surface to allow water separated from the fuel to flow towards the outlet wall from which the blocking surface extends.

11 Claims, 9 Drawing Sheets

(51) Int. Cl.
 *F02M 37/24* (2019.01)
 *B01D 29/15* (2006.01)
 *B01D 29/56* (2006.01)

(52) U.S. Cl.
 CPC ....... *F02M 37/32* (2019.01); *B01D 2201/282* (2013.01)

(56) References Cited

U.S. PATENT DOCUMENTS

| | | | |
|---|---|---|---|
| 2010/0206800 A1* | 8/2010 | Veit | B01D 36/003 210/416.4 |
| 2012/0043267 A1 | 2/2012 | Thienel | |
| 2020/0171416 A1* | 6/2020 | Girondi | B01D 35/005 |

FOREIGN PATENT DOCUMENTS

| | | |
|---|---|---|
| EP | 0 858 825 A1 | 8/1998 |
| EP | 2 399 019 B1 | 4/2013 |
| EP | 2 857 669 A2 | 4/2015 |
| EP | 3 648 864 B1 | 7/2021 |

OTHER PUBLICATIONS

Examination Report for European Patent Application No. 18783105.2 dated Mar. 5, 2021, 5 pages.
International Search Report and Written Opinion of the International Searching Authority for International Patent Application No. PCT/IB2018/057039 dated Nov. 14, 2018, 9 pages.

* cited by examiner

FIG.7c"

WATER SEPARATION UNIT

FIELD OF APPLICATION

This application is a National Stage Application of PCT/M2018/057039, filed 14 Sep. 2018, which claims benefit of patent application Ser. No. 102017000103387, filed 15 Sep. 2017 in Italy and which applications are incorporated herein by reference. To the extent appropriate, a claim of priority is made to each of the above-disclosed applications.

The present invention falls within the automotive field. Specifically, it relates to filtration and separation assemblies of fuel, preferably of diesel type, which are placed upstream of the combustion chamber of the internal combustion engine. In other words, the fuel in output from such filtration and separation assemblies flows in the fuel circulation system towards the engine group.

In particular, these assemblies have a dual function: they have the purpose of filtering the fuel to remove any suspended particles and/or impurities therefrom that could damage the components of the fuel circulation system downstream, such as the engine group or the high-pressure pump; they have the purpose of separating any water particles in the fuel that could damage the components of the fuel circulation system downstream, such as the injectors and/or that could cause non-optimal combustion.

A plurality of fuel filtration and separation assemblies are known in the prior art having said dual functionality.

In particular, fuel filtration and separation assemblies are known, having a vertical development, that is, adapted to be installed in the vehicle and to operate in a substantially vertical position. Such assemblies have in the upper portion thereof filtration and/or separation groups adapted to perform the respective actions on the fuel and in the lower portion thereof a water collection chamber, in which the water separated from the fuel accumulates by the action of the force of gravity.

An embodiment showing this type of fuel filtration and separation assemblies is shown in document EP0858825.

However, not always in the vehicle there is the possibility of having the fuel filtration and separation assembly in a vertical position.

For this reason, embodiments of fuel filtration and separation assemblies are also known, having a horizontal development, that is, adapted to be installed in the vehicle and to operate in a substantially horizontal position.

However, such fuel filtration and separation assemblies with horizontal development have significant technical drawbacks.

The known assemblies, in fact, perform a separation of water from fuel that is poorly effective, but above all they exhibit great difficulty to collect the water separated from the fuel.

For these reasons, the known water filtration and separation assemblies have particularly complex and cumbersome geometries. Embodiments of fuel filtration and separation assembly are in fact known in which a water collection chamber is provided in a lower position with respect to the filtration devices. In other words, while the known embodiments operate with the fuel in a horizontal direction, they have an at least partially vertical development for providing a water collection chamber at the bottom.

Embodiments of fuel filtration and separation assemblies with horizontal development according to such a description are shown in documents EP2399019 and DE102006005108.

Solution of the Invention

The need to provide a water separation group for fuel separation and filtration assemblies with horizontal development in which the above-mentioned problems are resolved is therefore strongly felt. Likewise, the need to provide a fuel separation and filtration assembly which comprises such a water separation group is strongly felt.

The object of the present invention is indeed to provide a water separation group with horizontal development in which the separation operations are carried out in an effective and efficient manner, but above all that has a simple and compact geometry in which the vertical dimensions are as much as possible limited.

The dependent claims describe preferred embodiment variants involving further advantageous aspects.

DESCRIPTION OF THE DRAWINGS

Further features and advantages of the invention will be made readily apparent from the following description of preferred embodiment examples thereof, provided purely by way of a non limiting example, with reference to the accompanying figures, in which.

DETAILED DESCRIPTION

Figure 1:
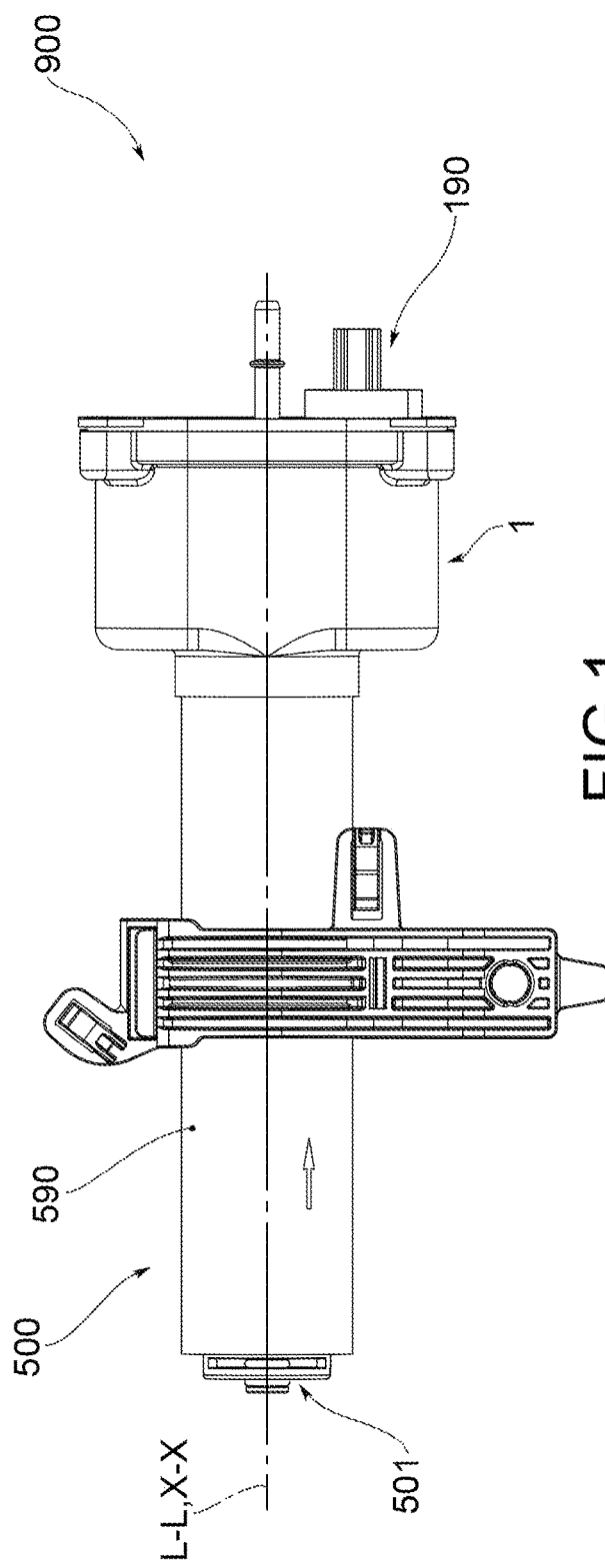
FIG. 1 shows a top view of the fuel filtration and separation assembly object of the present invention, according to a preferred embodiment.
Figure 2:
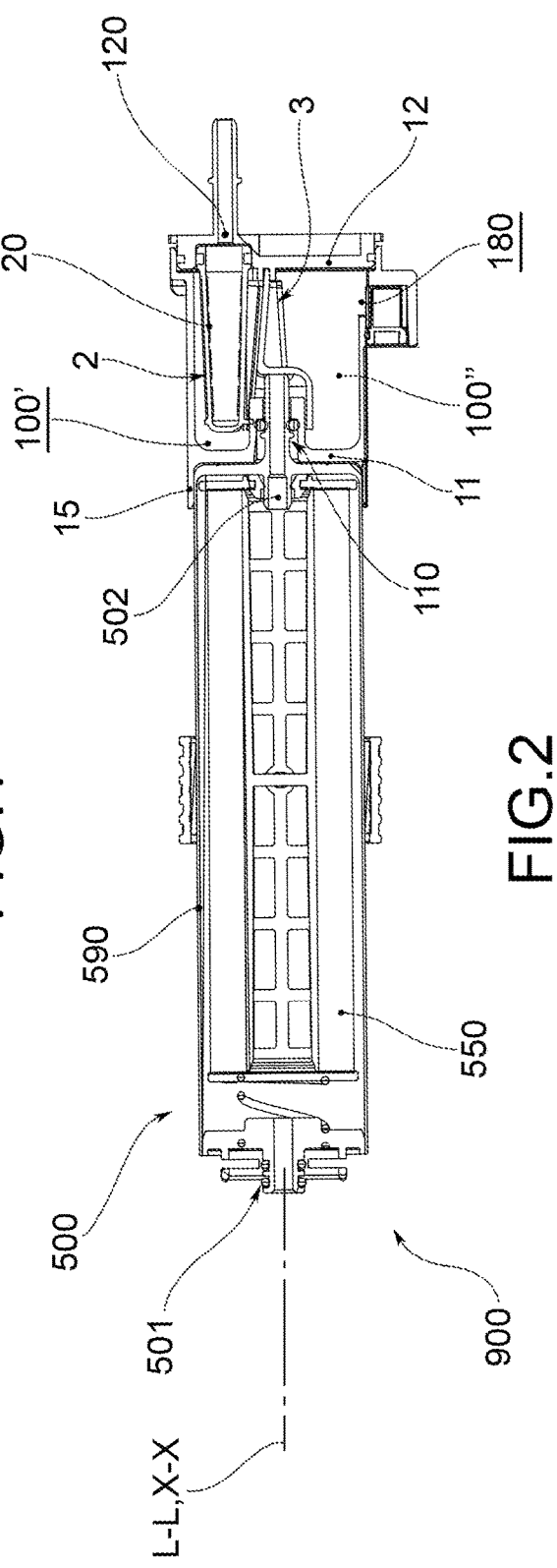
FIG. 2 shows a side longitudinal sectional view of the fuel filtration and separation assembly shown in FIG. 1.
Figure 3:
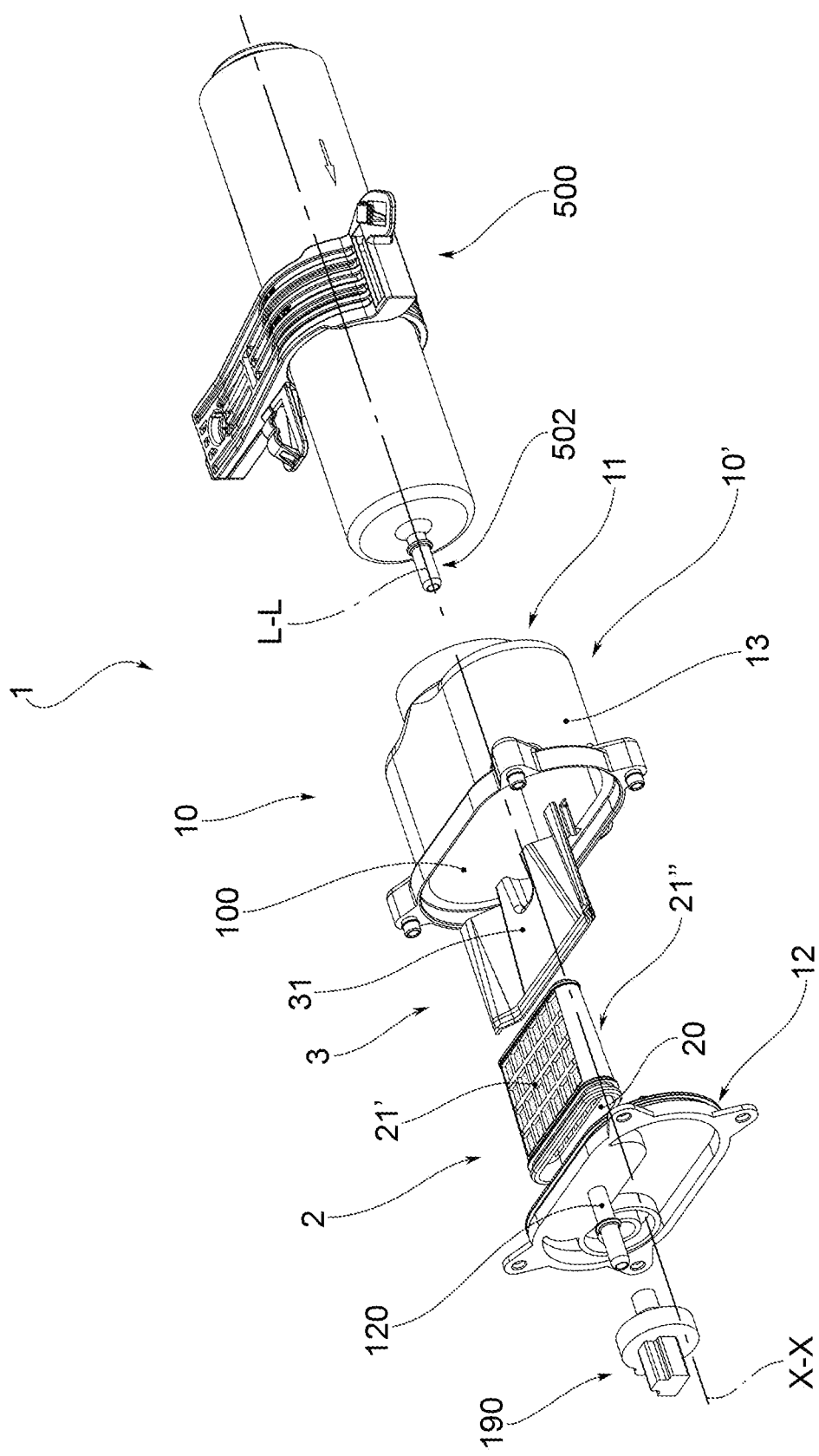
FIG. 3 shows a perspective sectional view with separate parts of the fuel filtration and separation assembly shown in FIG. 1.
Figure 4:
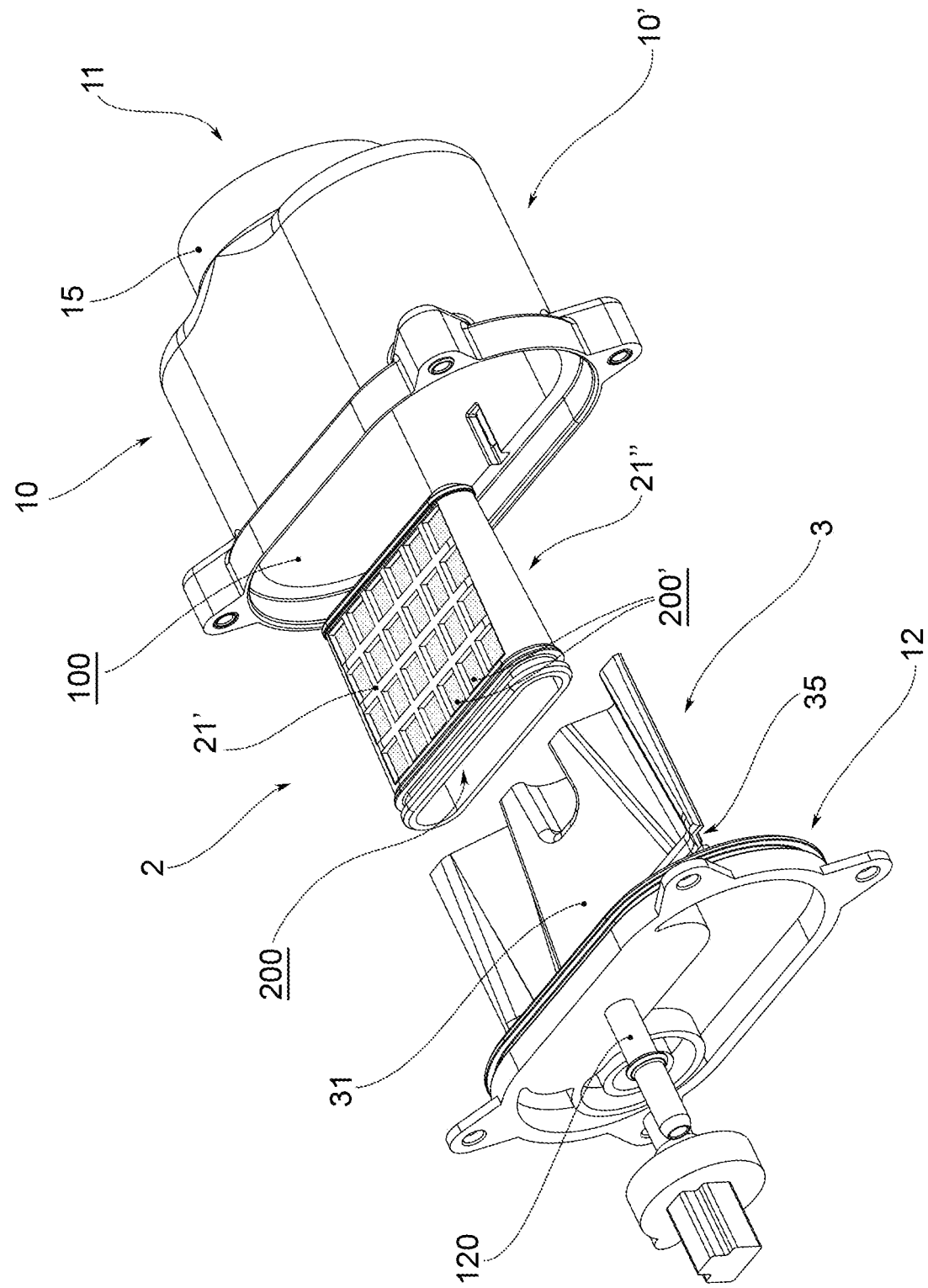
FIG. 4 shows a perspective sectional view with separate parts of a separation group object of the present invention, according to a preferred embodiment herein comprised in the filtration and separation assembly shown in FIGS. 1 to 3.
Figure 5A:
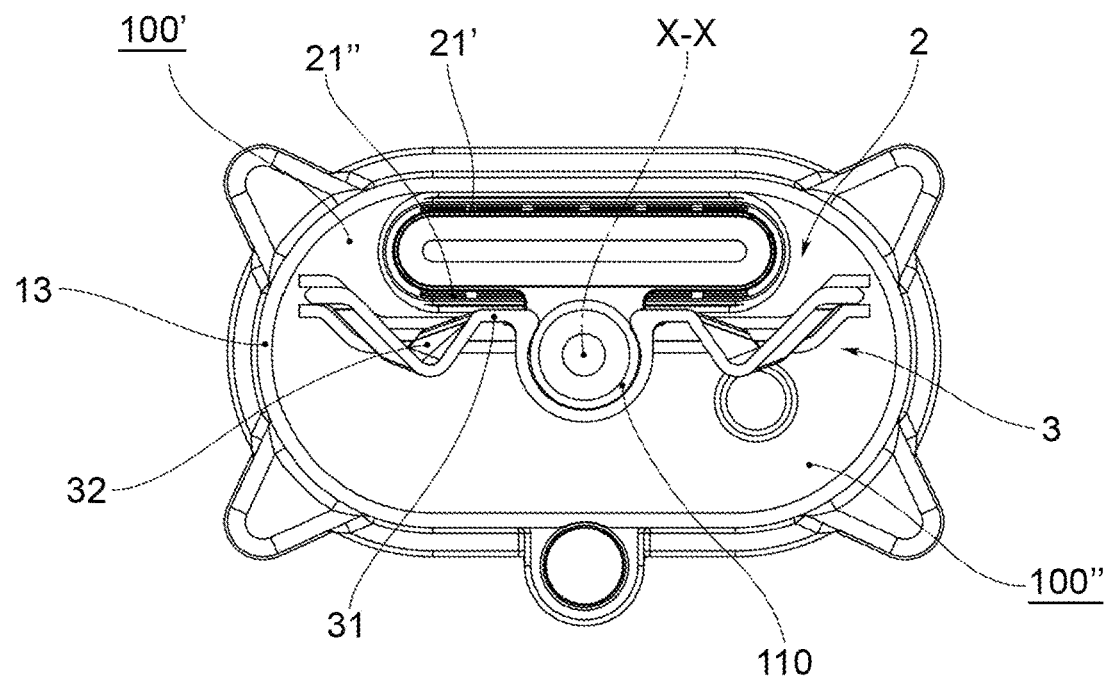
FIGS. 5a and 5b show the separation group of FIG. 4 in a front view and a top sectional view, respectively.
Figure 5B:
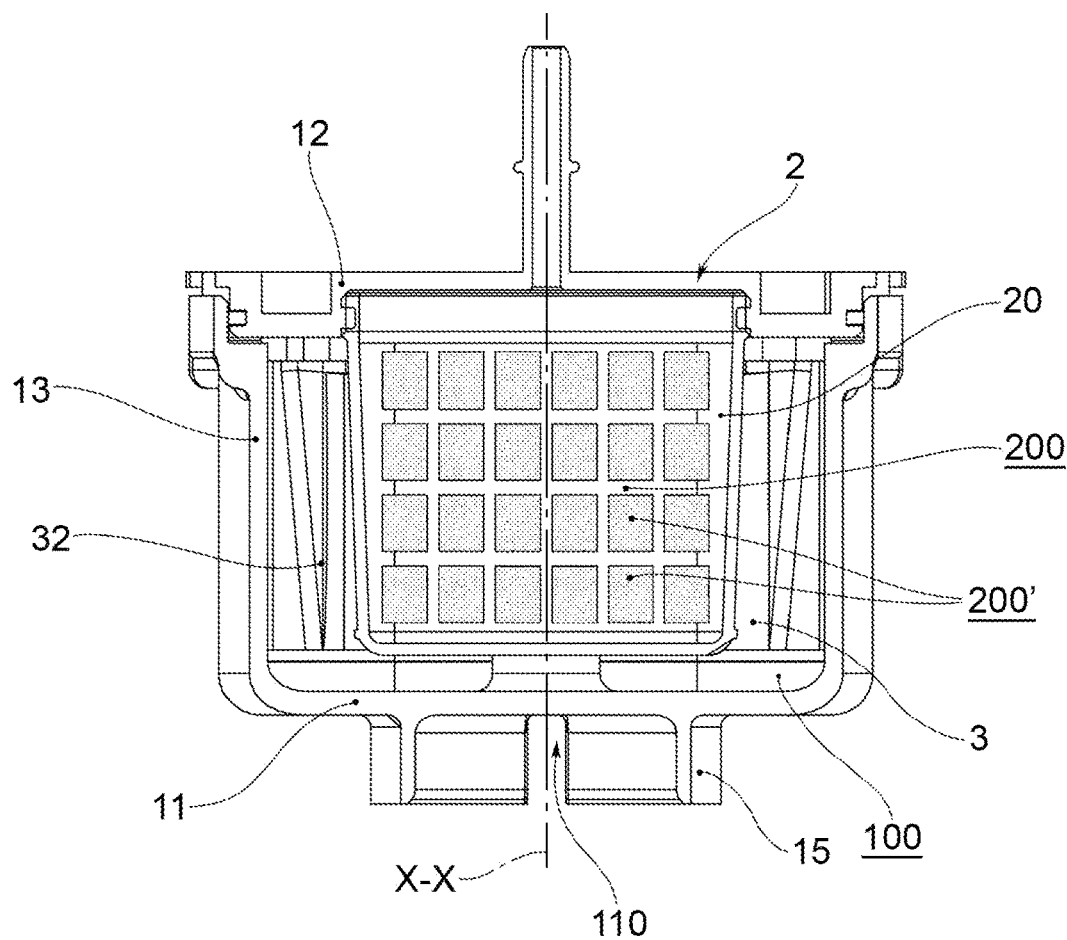
Figure 6A:
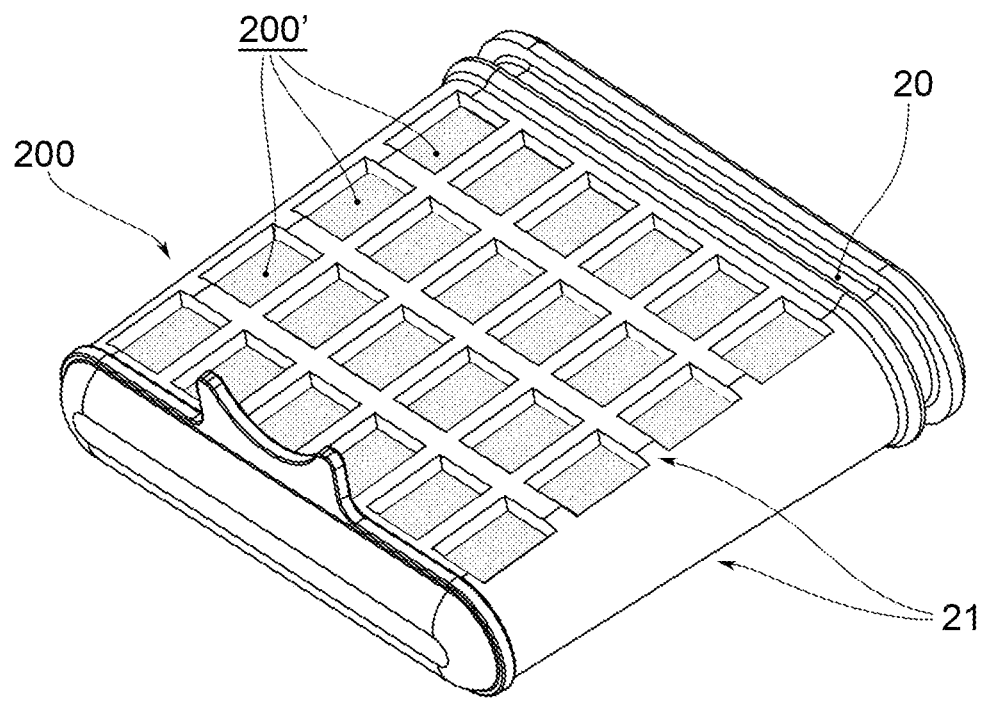
FIGS. 6a, 6b, 6c and 6d show a separator device of a separation group such as that in FIG. 4, in a perspective view, a top view, a front view and a side view, respectively.
Figure 6B:
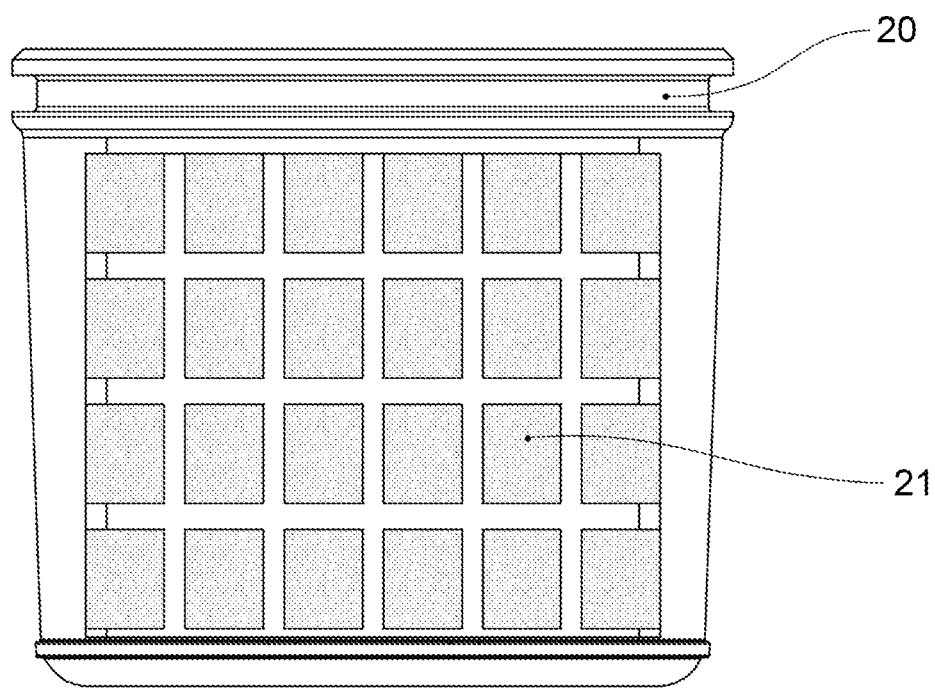
Figure 6C:
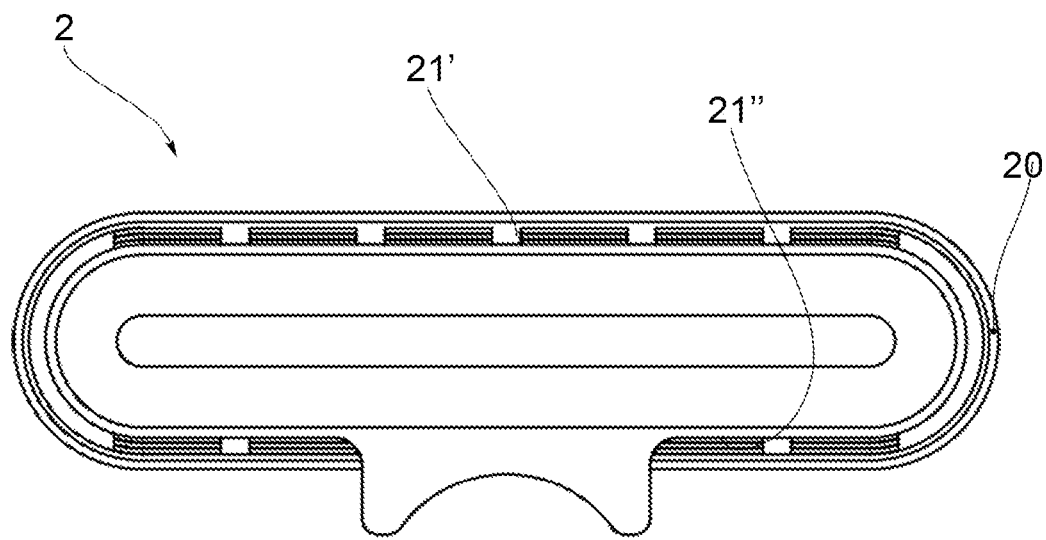
Figure 6D:
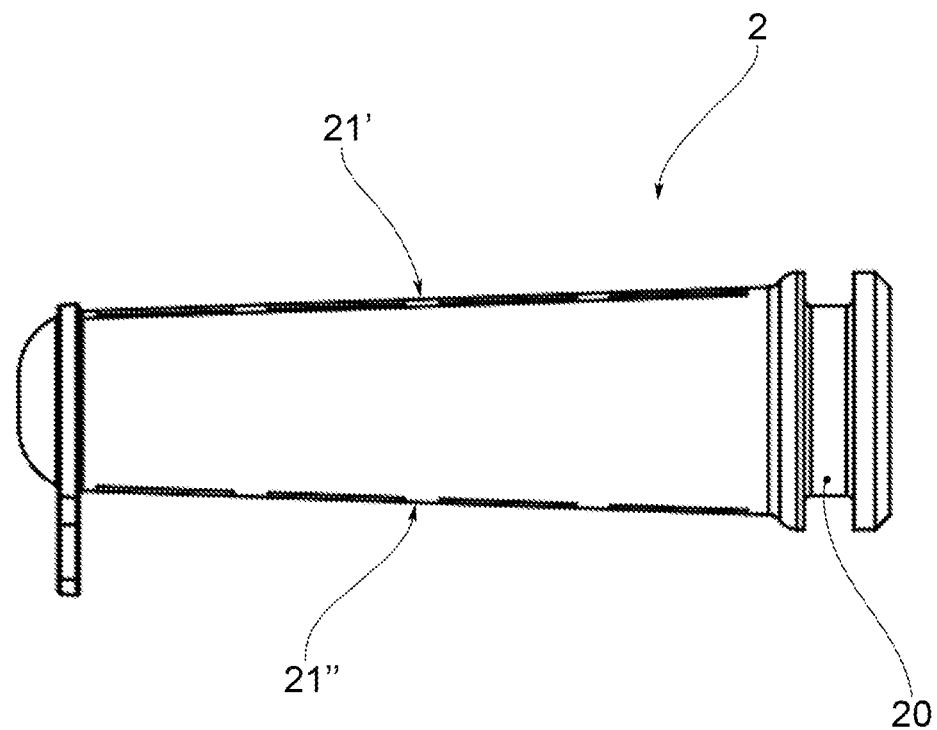
Figure 7A:
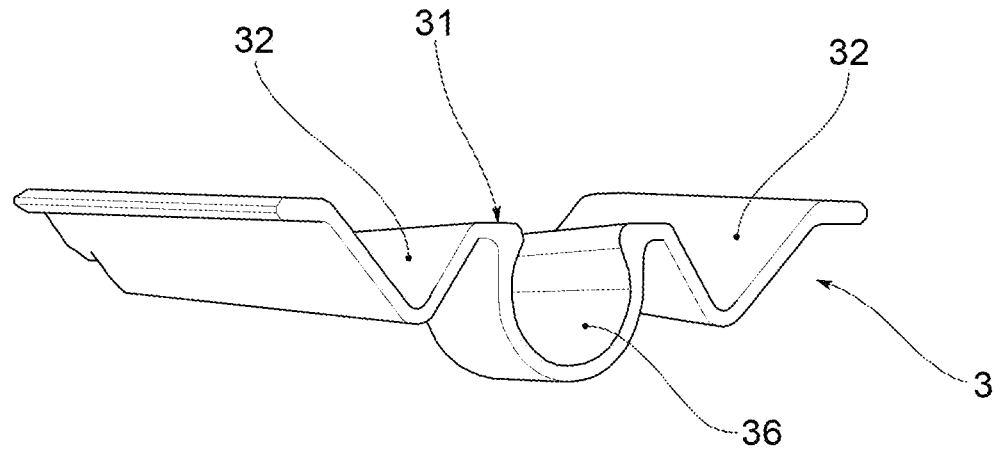
FIGS. 7a', 7a", 7b, 7c', 7c" and 7d show a blocking device of a separation group such as that in FIG. 4, in two perspective views, a top view, a front view, a rear view and a side view, respectively.
Figure 7A:
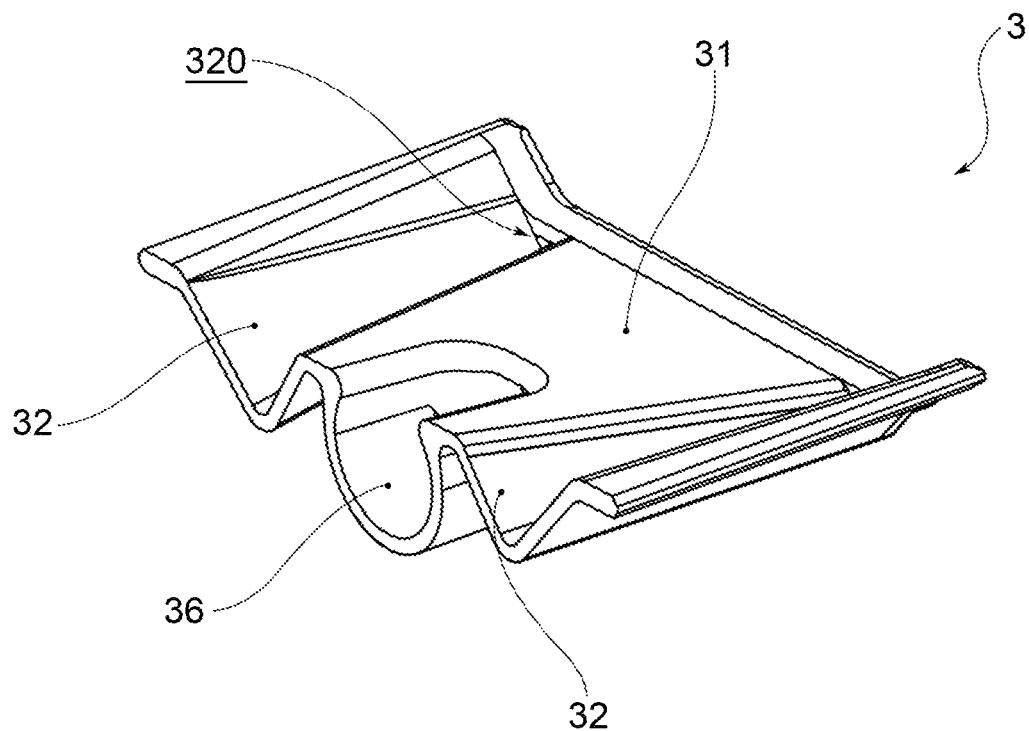
Figure 7B:
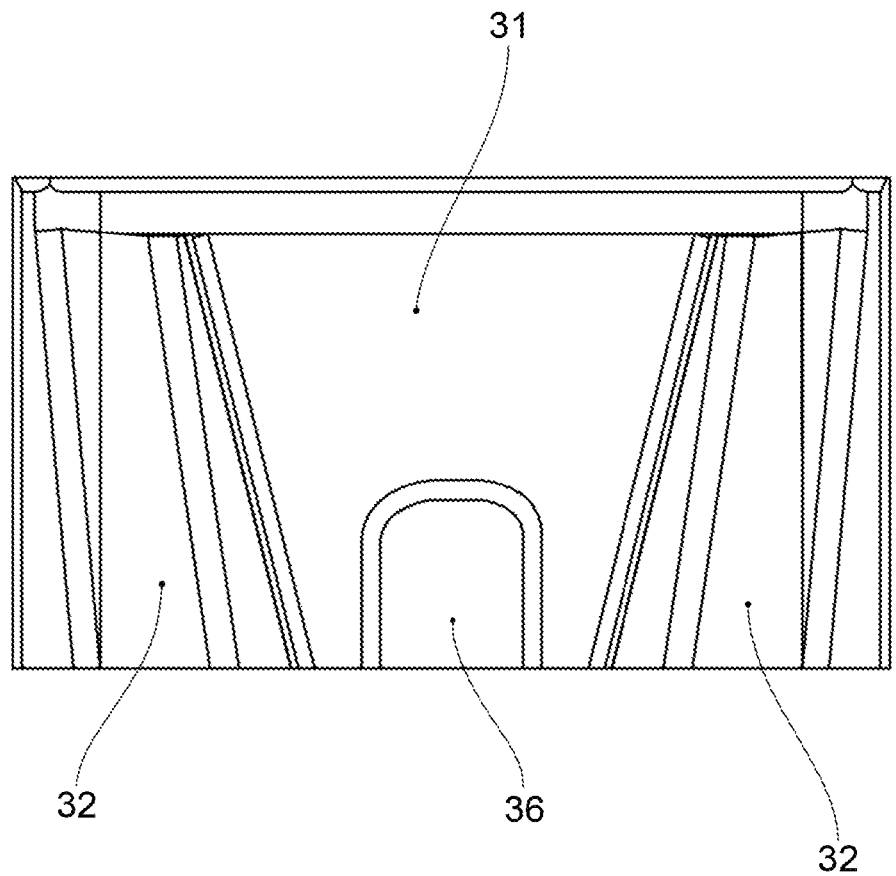
Figure 7C:
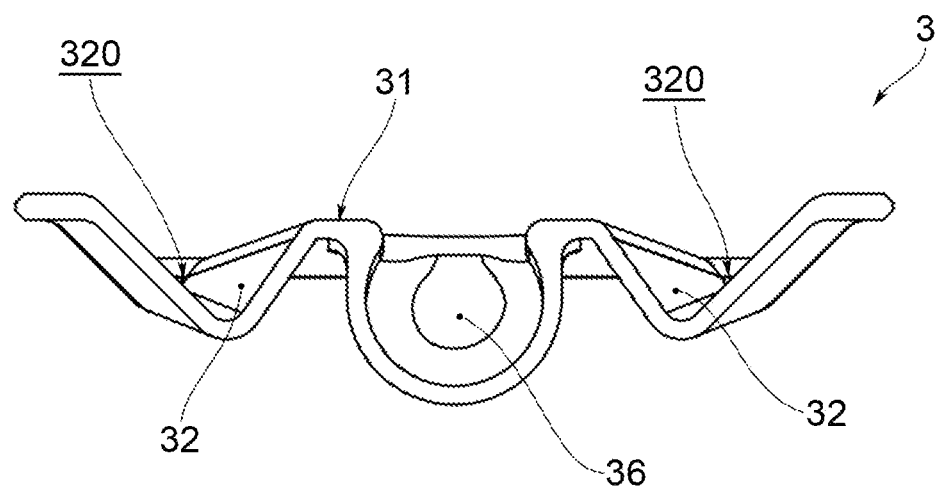
Figure 7D:
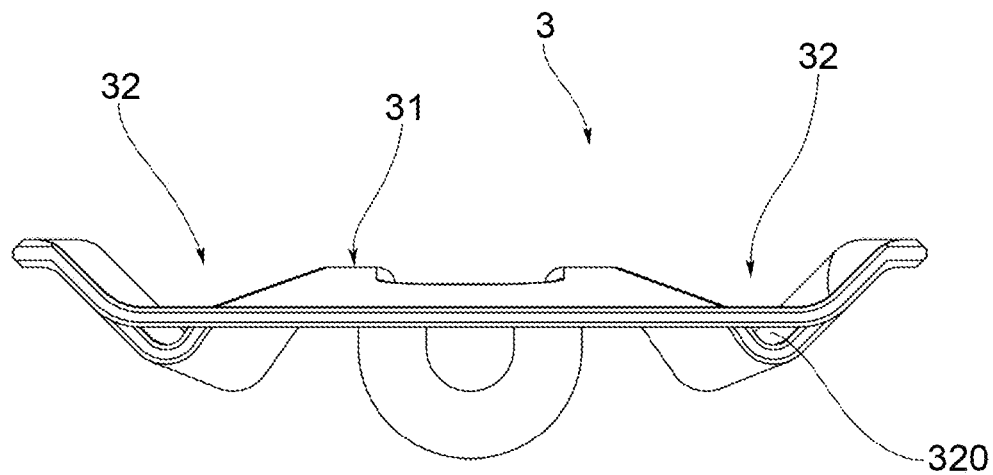
Figure 7D:
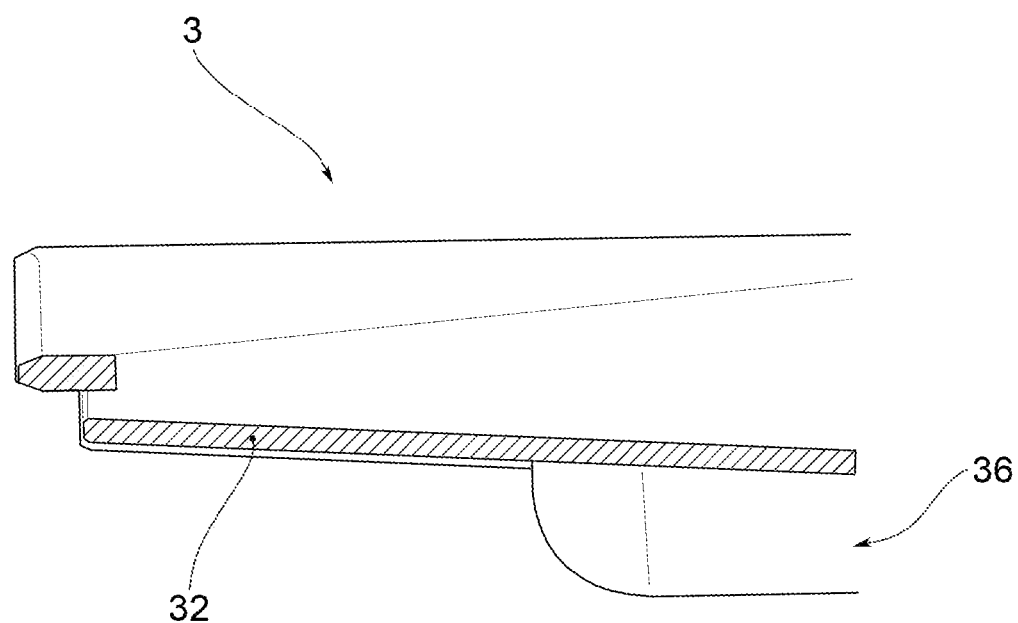

In the accompanying figures, reference numeral 1 denotes a water separation group according to the present invention, according to a preferred embodiment.

Such a water separation group 1 is specific for a fuel filtration and separation assembly 900 of a fuel circulation system of a vehicle. The fuel filtration and separation assembly 900 which comprises said water separation group 1 is also in turn object of the present invention.

Both the separation group 1 and assembly 900 fall within the context described above, operating in a horizontal configuration, i.e. being accommodated in the vehicle in a substantially horizontal position; where "horizontal position" means that these components operate in the vehicle, fluidically connected with the fuel circulation system, in a position substantially parallel to the ground plane along which the vehicle moves. Other references to areas, portions and/or components of the water separator group and of the fuel filtration and separation assembly that are "lower", "upper", "side" are to be considered as a function of said horizontal positioning thereof in the vehicle.

In particular, assembly 900 extends along a longitudinal axis L-L whose position, with the assembly mounted in the vehicle, is substantially horizontal.

According to the present invention, the fuel filtration and separation assembly 900 performs a dual action on the fuel circulating in the circuit: in fact, as widely described below and also shown in the accompanying figures, the fuel filtration and separation assembly 900 is adapted to perform a filtering action on the dirty fuel to filter it from suspended particles and impurities and also is adapted to perform a separation action on filtered fuel to separate it from water.

For these reasons, assembly 900 comprises, in addition to the water separation group 1, specifically adapted to perform the operations of separation of water from fuel, a filtration group 500 which is instead specific for the filtration of dirty fuel from suspended solid particles and impurities.

That is to say, in the first place, the dirty fuel intercepts the filtration group 500 where it is filtered from impurities, and secondly, the filtered fuel intercepts the water separation group 1 where it is separated from water, in such a way that clean fuel flows downstream of assembly 900. According to a preferred embodiment, the filtration group 500 is also adapted to perform an action of coalescence of water emulsified in the fuel in the form of small droplets, typically less than 100 microns in diameter (typically less than 50 microns in diameter) in such a manner that they are aggregated to form water particles of size larger than 200 microns (preferably even up to 2 mm) or in any case larger than the drops of water in input to the filtration group 500, so that the water separation group can operate on aggregated water particles.

In particular, the water separation group 1 is fluidically connected to the filtration group 500 being mutually serially positionable along the longitudinal axis L-L. In other words, assembly 900 along the longitudinal axis L-L has the filtration group 500 first and then the water separation group 1. In yet further other words, the water separation group 1 is associable in a longitudinal direction with said filtration group 500.

According to a preferred embodiment, the fuel filtration group 500 and the water separation group 1 have a mutual engagement of the "plug-socket" type. In particular, the fuel filtration group 500 and the water separation group 1 comprise respective insertion portions adapted to extend in the consecutive group and respective receiving portions adapted to accommodate said insertion portions.

That is to say, assembly 900 is longitudinally composable in a modular mode: each group (or module) comprised therein performs specific operations on the fuel, such as filtration operations or separation operations.

Preferably, assembly 1 further comprises a fuel heating group (not shown in the figures) associable with the fuel filtration group 500, preferably with a longitudinal mutual engagement, at the opposite end thereof with respect to that at which the water separation group 1 is associated. Preferably, such a group (module) is adapted to perform the fuel heating operations in such a way as to prevent paraffin crystals or water from clogging the filtration group 500.

The present invention is not limited to the shape and size of the filtration group 500 but some portions of the water separation group 1 are complementary thereto to promote the mutual axial engagement.

However, in a preferred embodiment, the fuel filtration group 500 is of the tubular type. Preferably, the fuel filtration group 500 comprises a casing 590 having a development substantially axial-symmetric with respect to the longitudinal axis L-L.

According to a preferred embodiment, the fuel filtration group 500 comprises, accommodated therein, at least one tubular insert 550 which extends along the longitudinal axis L-L, traversable in a radial manner by the fuel, preferably from the outside to the inside.

According to a preferred embodiment, the fuel filtration group 500 has one or more inlet openings 501 through which dirty fuel enters and an outlet nozzle 502 from which filtered fuel flows. Said outlet nozzle 502 is positioned on the longitudinal axis L-L. Said outlet nozzle 502 extends, axially protruding, along the longitudinal axis L-L.

According to a preferred embodiment like the one shown in the accompanying figures, the water separation group 1 is adapted to engage, fluidically connected, with said outlet nozzle 502, preferably in such a way as to accommodate it at its interior. In other words, the outlet nozzle 502 extends "plug-wise" inside the water separation group 1 in a mounted configuration.

According to the present invention, the water separation group 1 comprises a main body 10 which extends along a main axis X-X.

In a configuration in which the separation group 1 is mounted in the vehicle, the main axis X-X and the longitudinal axis L-L are substantially parallel and/or coincident. That is to say, said main body 10, in turn, has a substantially longitudinal development.

Said main body 10 delimits therein a separation chamber 100, in which said water-fuel separation operations are carried out.

According to a preferred embodiment, the main body 10 therefore has a substantially box shape.

Preferably, the main body 10 comprises a cup body 10' provided with a head wall 11 substantially orthogonal to the main axis X-X and side walls 13 having an axial development substantially parallel to the main axis.

According to a preferred embodiment, said head wall 11 is engageable with the filtration group 500.

Preferably, the head wall 11 comprises, in fact, an inlet mouth 110 in which the filtered fuel flows. Preferably, the outlet nozzle 502 of the filtration group 500 is adapted to be accommodated in said inlet mouth 110.

According to a preferred embodiment, moreover, the main body 10 comprises an insertion collar 15 fittable on the filtration group 500 to perform the mutual insertion in the longitudinal direction between the water separation group 1 and the filtration group 500.

Preferably, said insertion collar 15 extends in height from the head wall 11.

According to the embodiment in which the filtration group 500 has a tubular shape, said insertion collar 15 has a substantially annular shape to engage the walls of the casing of the filtration group 500.

To close said cup body 10', the main body 10 comprises, at an axial end, an outlet wall 12. Such an outlet wall 12 comprises at least one outlet mouth 120 from which clean fuel flows as a result of the separation operations. In other words, the outlet wall 12 is formed on a component having a plug function.

According to a preferred embodiment, the water separation group 1 and the fuel filtration group 500 are mutually engageable in a unique angular position. In other words, as shown in the accompanying figures, both in the water separation group 1 and in the fuel filtration group 500 and in assembly 900, an upper side and a lower side are identifiable, with respect to a vertical direction, transverse to the respective development axes, i.e. the longitudinal axis L-L or the main axis X-X.

Moreover, the water separation group 1 according to the present invention comprises a separator device 2 accommodated in the separation chamber 100 fluidically connected with the outlet mouth 120 adapted to perform the separation operations.

Said separator device 2 extends in the longitudinal direction starting from said outlet wall 12. Preferably, in fact, the separator device 2 is integrally mountable to said outlet wall 12. Preferably, the separator device 2 is formed integrally with the outlet wall 12.

According to the present invention, the separator device 2 comprises a supporting structure 20 traversable by fuel, identifying a dirty side, in which filtered fuel coming from the filtration group flows, and a clean side (fluidically connected with the outlet mouth 120) from which clean fuel separated from water flows.

The supporting structure 20 is in fact preferably hollow.

The supporting structure 20 comprises at least one passage opening 200 through which the fuel flows. Preferably, on said opening the separator device 2 comprises a separation surface 21 constituting of a hydrophobic filtration means transverse to said passage opening 200.

According to a preferred embodiment, such a supporting structure 20 is fixable or is fixed to the outlet wall 12 in such a way as to have the inner side, clean, fluidically connected with the outlet mouth 120.

Preferably, as also shown in the accompanying figures, on said supporting structure 20 according to a preferred embodiment, each passage opening 200 is divided into a plurality of passage sub-openings 200' planarly aligned with each other. Preferably, therefore, the separation surface 21 extends planarly on a plurality of auxiliary openings.

According to a preferred embodiment, moreover, the separator device 2 has predominant development in the longitudinal direction with respect to the vertical direction.

According to a preferred embodiment, such separation surfaces 21 are arranged with respect to the direction of the main axis X-X inclined in such a way as to converge moving away from the outlet wall 12. Preferably, the supporting structure 20 has a shape such that the separation surfaces 21 arranged thereon have such a converging shape.

According to a preferred embodiment, the separator device 2 comprises an upper separation surface 21' and a lower separation surface 21". In other words, according to a preferred embodiment, two separation surfaces are substantially identified which extend longitudinally.

Preferably, the supporting structure 20 has respective upper and lower passage openings 200 (according to what described and represented by way of example in the figures, each passage opening has a plurality of passage sub-openings 200').

According to a further preferred embodiment, the separator device 2 comprises a separation surface 21 oriented orthogonally with respect to the longitudinal axis L-L.

Preferably, said separation surface is vertically oriented. According to a preferred embodiment, said separation surface 21 is provided on the bottom wall of the supporting structure 20, oriented transversely to the longitudinal axis L-L and axially spaced from the outlet wall 12.

According to a preferred embodiment, the separation surfaces 21 consist of a hydrophobic filtration mean adapted to promote the separation of water when traversed by the fuel.

Preferably, said hydrophobic filtration mean is made in the form of non-woven fabric of synthetic fibers (such as PA, PET, PBT, polyester, viscose) or in the form of fabric (PA, PET or PBT), for example treated with silicone or PTFE or plasma, such as to have a static water contact angle greater than 90°, resulting non-wettable to water, and being therefore adapted to perform a "barrier" effect to water, being instead fuel-permeable.

According to a preferred embodiment, the separator device comprises a single filtration means fixed to the supporting structure: at each plane and at each separation surface arranged thereon are identified the respective separation surfaces 21.

According to the foregoing, the separation device 2 preferably has a tapered shape, moving longitudinally away from the outlet wall 12. In a vertical longitudinal section, the separation device 2 (and in particular the supporting structure 20) has a shape that is substantially triangular or trapezoidal or frustoconical, having the upper separation surface 21' and the lower separation surface 21" at the two opposite longitudinal sides.

According to the present invention, the water separation group 1 further comprises a blocking device 3, in turn accommodated in the separation chamber.

In particular, the blocking device 3 is positioned below the separator device 2, thereby dividing the separation chamber 100 into an upper region 100' in which the separator device 2 is accommodated, and a lower region 100" in which the water separated from the fuel is collected.

The blocking device 3 is therefore adapted to prevent the return of water into the upper region 100'.

In particular, the blocking device 3 comprises a drainage region arranged in the proximity of the outlet wall and positioned below the outlet mouth 120 in order to facilitate the drainage of the separated water towards the lower region 100". In addition, such a blocking device 3 has openings and/or sliding surfaces provided to ensure the drainage of the separated water towards the collection region while minimizing the accumulation of water in the proximity of the outlet mouth.

According to a preferred embodiment, the blocking device 3 comprises a blocking surface 31 which extends from the outlet wall 12 in a longitudinal direction. Preferably, in fact, the blocking device 3 is integrally mountable to said outlet wall 12. Preferably, the blocking device 3 is formed integrally with the outlet wall 12. According to a preferred embodiment, the blocking device 3 comprises a blocking surface 31 which extends from the inlet wall 11, integrally mountable to said inlet wall 11. Preferably, the blocking device 3 is formed integrally with the inlet wall 11.

According to the present invention, said blocking surface 31 forms an angle with the direction of the main axis X-X that inclines at least a portion of said blocking surface 31 so as to allow the water separated from the fuel to flow towards said outlet wall 12.

In a preferred embodiment, the blocking surface 31 extends in a substantially planar manner.

According to a preferred embodiment, said inclined portion of the blocking surface 31 is inclined, forming an angle with the main axis X-X substantially equal to the inclination angle according to which the separation surfaces 21 extend. In other words, the blocking surface 31 is substantially parallel to the separation surface 21 proximal thereto, preferably the lower separation surface 21".

The blocking surface 31 is shaped in such a way as to delimit the water collection region 100" in a form such as to have a greater height distancing longitudinally from the outlet wall 12, i.e. approaching the inlet wall 11.

According to a preferred embodiment, the blocking device 3 comprises at least one drainage channel 32 which extends in a longitudinal direction forming an opposite angle with respect to the angle formed by the blocking surface 31.

Preferably, the water separated by the separation device 2 flows from the upper region 100' to the lower region 100" in a double slide direction. The water separated by the separation device 2 by the action of the force of gravity tends to initially flow towards the outlet wall 12, flowing on the blocking surface 31, and then towards the inlet wall 11, flowing into the drainage channel 32, to then flow into the collection chamber 100".

In a preferred embodiment, the blocking device 3 comprises two drainage channels 32 arranged at the side edges of the blocking surface 31.

Preferably, the blocking surface 31 and the drainage channels 32 comprise connecting portions adapted to facilitate the above flow of water.

According to a preferred embodiment, the blocking device 3 comprises at least one passage opening 320 adapted to put the separation region 100' in fluid communication with the collection region 100".

According to a preferred embodiment, such a passage opening 320 is provided to allow the drainage of the water blocked by the separator device 2 towards the collection region 100". Preferably, such a passage opening 320 is dimensioned and positioned on said blocking device 3 in such a way as to minimize the return of water towards the separation region 100'. Preferably, such a passage opening is provided at the side edges of the blocking surface 31.

According to a preferred embodiment, the blocking device 3 comprises a fuel inlet channel 36 adapted to convey the filtered fuel coming from the filtration group 500 towards the separation device 2. Preferably, the fuel inlet channel 36 is integrated in one piece with the blocking device 3. Preferably, said fuel inlet channel 36 is laterally defined by lateral walls substantially vertical.

For example, the fuel inlet channel 36 extends longitudinally with a different angle, preferably opposite, to the angle at which the blocking surface 31 is inclined. Preferably, the fuel inlet channel 36 is, hence, adapted to convey the filtered fuel towards the separation device 2. Preferably, by means of said inlet channel 36 the risk that the filtered flue coming from the filtration chamber is re-mixed with the free water collected in the lower region of the separation chamber is reduced. In this way it is reduced the risk that eventual portions of water are re-mixed with the diesel in the form of fine drops (for example less than 200 microns) and transported downstream of the separation device 2.

Preferably, the fuel inlet channel 36 extends substantially the frontally to the inlet mouth 110, i.e., preferably, frontally to the outlet nozzle 502 of the filtration group 500. In a preferred embodiment, the outlet nozzle 502 is accommodated in said fuel inlet channel 36. Preferably, by means of this configuration, the chance that there is a possible return of water, separated by the separation device, towards the filtration unit 500 is obviated/minimized.

According to the foregoing and as shown in the accompanying figures by way of example, the water separation group 1 has a substantially elongated development.

Preferably, the water separation group 1 has a height substantially equal to the height of the filtration group 500.

According to a preferred embodiment, the water separation group 1 preferably extends in a lateral direction. In other words, in a preferred embodiment, the water separation group 1 preferably extends in a lateral direction, substantially parallel to the horizontal ground plane on which the vehicle moves. In other words, instead of having a vertical development, the water separation group 1 has a horizontal development.

According to a preferred embodiment, in the lower portion thereof, the water separation group 1 also has a purge hole 180, closed by a suitable plug, adapted to allow the purging operations of the collected water.

Moreover, again according to a preferred embodiment, the water separation group 1 also comprises a water level sensor 190 adapted to detect the amount of water collected in the separation chamber 100 and in particular in the lower region 100".

Innovatively, the water separation group and the filtration and separation assembly comprising the same amply meet the object of the present invention overcoming the typical drawbacks of the prior art.

Advantageously, in fact, the water separation group, while being specifically adapted to operate and to be positioned in the vehicle in a horizontal position, performs effective water-fuel separation operations.

Advantageously, the water separation group is adapted to operate effectively with both the fuel circulated in pressure thrust and with the fuel in suction circulation.

Advantageously, the separation device has separation surfaces which have a predominant longitudinal extension and are adapted to process high fuel flow rates. In other words, advantageously, the separation device is adapted to have a large treatment surface.

Advantageously, thanks to the large filtration surface provided by a separator device having a conical shape, trapezoidal or, in general, tapered, the separator device is adapted to perform the fuel-water separation operations by minimizing the pressure drops in the fuel supply circuit.

Advantageously, moreover, the separation group has the respective components with a shape adapted to promote the accumulation of water in a lower region.

Advantageously, the inclined walls of the separation device are adapted to facilitate, in addition to the collection of water, a rapid slope thereof.

Advantageously, the blocking device is structured to facilitate the water slope by means of the double slide. At the same time, the blocking device is structured to prevent the accumulated water from returning to the separation device.

Advantageously, the water collected in the collection area is prevented from returning into the separation area even when the vehicle is facing an uphill or a downhill and/or when the vehicle makes a sudden braking.

Advantageously, the blocking device is adapted to divide the separation chamber having a water accumulation region of the largest possible size, optimized for the manufacturer's needs.

Advantageously, the blocking device is positioned in the proximity of the separation device defining a collection region that extends in height moving away from the outlet wall.

Advantageously, the blocking device is configured to increase the extension of the collection chamber and at the same time minimize the risk that any water droplets reach the separation region from the collection region when the amount of water accumulated in the same collection region is close to or above the threshold level defined by the water level sensor.

Advantageously, the water separation group does not require a water collection chamber with a vertical development or which extends in a lower position with respect to the filtration group.

Advantageously, the separator device is manufacturable with simple operations, such as is manufactured by molding, for example in such a manner that the hydrophobic filtration mean is co-molded with the supporting structure.

Advantageously, the blocking device is obtainable through simple molding operations to be formed integrally with the inlet wall or with the outlet wall or, in general, with the side walls of the main body of the water separation group.

Advantageously, the blocking device comprises a inclined blocking surface which allows facilitating the machining of the workpiece by means of molding and facilitating the extraction of the main body or the outlet wall if the blocking device is formed integrally with these components.

Advantageously, the water separation group is optimized to perform efficient operations of separation, collection, and water accumulation.

Advantageously, the water separation group is a separate module, mountable to the filtration group in case of need. Advantageously, the water separation group and the filtration group are mutually arranged in series with respect to one another in the vehicle fuel circulation circuit.

Advantageously, the water separation group is associable with a horizontal filtration group, in such a way to add such a function related to the fuel-water separation to filtration groups otherwise not adapted to perform such operations. Advantageously, preferably, the water separation group is associable to a horizontal filtration group available on the market.

It is clear that a man skilled in water separation group or to the filtration and separation assembly in order to meet incidental needs, all falling within the scope of protection defined in the following claims.

LIST OF REFERENCE NUMERALS 1 water separation group
2 separation device
20 bearing supporting structure
200 passage opening
200' passage sub-opening
21 separation surface
21' upper separation surface
21" lower separation surface
3 blocking device
31 blocking surface
32 drainage channel
320 passage openings
36 fuel inlet channel
10 main body
10' cup body
11 inlet wall
110 inlet mouth
12 outlet wall
120 outlet mouth
13 side walls
15 insertion collar
100 separation chamber
100' upper region
100" lower region
180 purge hole
190 water level sensor
900 fuel filtration and separation assembly
500 filtration group
501 inlet opening
502 outlet nozzle
550 tubular insert
590 casing
X-X main axis
L-L longitudinal axis

The invention claimed is:

1. A water separation group for a fuel filtration and separation assembly of a fuel circulation system of a vehicle, wherein the assembly extends along a longitudinal axis positionable in the vehicle in a horizontal position, comprising a filtration group for filtering dirty fuel from suspended solids and impurities, wherein the water separation group is fluidically connectable to the filtration group to receive filtered fuel and is serially positionable along the longitudinal axis; the water separation group comprising:

a main body associable to the filtration group extending along a main axis so that in a configuration in which the water separation group is associated to the filtration group, the main axis and the longitudinal axis are substantially parallel and/or coincident, wherein the main body delimits therein a separation chamber and comprises, at an axial end, an outlet wall having at least one outlet mouth from which clean fuel flows;

a separator accommodated in the separation chamber fluidically connected with the outlet mouth extending in longitudinal direction starting from said outlet wall and comprising a hollow supporting structure with a clean side fluidically connected with the outlet mouth, said supporting structure comprising at least one passage opening through which the fuel flows, wherein the separator comprises a separation surface comprising a hydrophobic filter arranged transversely to the at least one passage opening;

a blocking device positioned below the separator dividing the separation chamber in an upper region in which the separator is accommodated, and a lower region, in which the water separated from the fuel is collected, wherein the blocking device is adapted to prevent return of water in the upper region comprising a blocking surface extending in a longitudinal direction forming an angle with the direction of the main axis which inclines at least a portion of said blocking surface to allow the water separated from the fuel to flow towards said outlet wall;

wherein the separator has a shape inclined in a longitudinal direction relative to a vertical direction, and the supporting structure comprises a plurality of passage openings on which a plurality of separation surfaces are present, wherein the separation surfaces are arranged with respect to the direction of the main axis inclined to converge moving away from the outlet wall.

2. Water separation group according to claim 1, wherein the blocking device comprises at least one drainage channel extending in a longitudinal direction forming an opposite angle with respect to the angle formed by the blocking surface, so that the water separated by the separator flows from the upper region to the lower region in a double slide direction.

3. Water separation group according to claim 2, wherein the blocking device comprises two drainage channels arranged at side edges of the blocking surface.

4. Water separation group according to claim 1, wherein the blocking device comprises at least one passage opening adapted to put the upper region and the lower region in fluidic communication, wherein said at least one passage opening of the blocking device is formed at side edges of the blocking surface.

5. Water separation group according to claim 1, wherein the blocking device comprises a fuel inlet channel adapted to convey the filtered fuel coming from the filtration group towards the separator.

6. Water separation group according to claim 5, wherein said fuel inlet channel extends longitudinally with a different angle with respect to the direction of the main axis, than the angle at which the blocking surface is inclined.

7. Water separation group according to claim 1, wherein the separator comprises an upper separation surface and a lower separation surface, the lower separation surface facing towards the blocking surface.

8. Water separation group according to claim 7, wherein the blocking surface is inclined, forming an angle with the direction of the main axis substantially equal to the angle at which the separation surfaces are inclined with respect to the direction of the main axis, so that the blocking surface is substantially parallel to the lower separation surface.

9. Water separation group according to claim 1, wherein the supporting structure is covered with a hydrophobic net, identifying at the at least one passage opening a respective separation surface.

10. Water separation group according to claim 1, wherein the main body comprises an inlet wall which comprises at least one inlet mouth adapted to be fluidically connected with the filtration group to allow inlet of the filtered fuel into the separation chamber.

11. Water separation group according to claim 1, wherein the main body comprises an insertion collar fittable on the filtration group to perform mutual insertion in the longitudinal direction between the water separation group and the filtration group.

* * * * *